(12) United States Patent
Kadar-Kallen et al.

(10) Patent No.: US 6,480,661 B2
(45) Date of Patent: Nov. 12, 2002

(54) OPTICAL ADD/DROP FILTER AND METHOD OF MAKING SAME

(75) Inventors: Michael Aaron Kadar-Kallen, Harrisburg, PA (US); Eric Timothy Green, Corning, NY (US); Shan Zhong, N. Billerica, MA (US); Warren Hale Lewis, Sunnyvale, CA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/791,156

(22) Filed: Feb. 22, 2001

(65) Prior Publication Data

US 2001/0036352 A1 Nov. 1, 2001

Related U.S. Application Data

(60) Provisional application No. 60/186,709, filed on Mar. 3, 2000.

(51) Int. Cl.[7] .................................................. G02B 6/00
(52) U.S. Cl. ......................................... 385/136; 385/33
(58) Field of Search ........................... 385/136, 33, 70, 385/72; 359/124, 127

(56) References Cited

U.S. PATENT DOCUMENTS

| | | | | |
|---|---|---|---|---|
| 4,836,638 A | * | 6/1989 | Finzel ...................... 350/96.21 |
| 5,453,827 A | * | 9/1995 | Lee ............................ 356/73.1 |
| 5,550,088 A | | 8/1996 | Dautartas et al. ........... 437/225 |
| 5,613,024 A | | 3/1997 | Shahid ......................... 385/52 |
| 5,657,155 A | * | 8/1997 | Cheng ..................... 359/341.1 |
| 5,703,973 A | | 12/1997 | Mettler et al. ................. 385/14 |
| 5,857,045 A | * | 1/1999 | Lee .............................. 385/70 |
| 5,920,670 A | * | 7/1999 | Lee et al. ...................... 385/78 |
| 5,943,454 A | * | 8/1999 | Aksyuk et al. ............... 385/22 |
| 6,015,239 A | | 1/2000 | Moore ......................... 385/92 |
| 6,327,405 B1 | * | 12/2001 | Leyva et al. .................. 385/37 |
| 6,349,165 B1 | * | 2/2002 | Lock ........................... 385/136 |

FOREIGN PATENT DOCUMENTS

| | | | | |
|---|---|---|---|---|
| EP | 0 959 373 A1 | * | 11/1999 | ............ G02B/5/20 |
| JP | 57158824 | * | 9/1982 | ............ G02B/7/26 |
| WO | WO 99/24854 | * | 5/1999 | ............ G02B/6/38 |

OTHER PUBLICATIONS

International Search Report, International application No. PCT/US01/06823, International filing date, Feb. 03, 2001.*

* cited by examiner

Primary Examiner—Khiem Nguyen
Assistant Examiner—Hae Moon Hyeon
(74) Attorney, Agent, or Firm—Synnestvedt & Lechner LLP (57) ABSTRACT

The invention is an optical ADD/DROP filter suitable for dense wavelength division multiplexing/de-multiplexing. It comprises an optical bench having a longitudinal V-groove into which the optical components of the ADD/DROP filter are passively aligned and bonded. The bench further includes first and second pairs of opposed, spaced, vertical members at each end between which a fiber array block is inserted. In the method of constructing the ADD/DROP filter, an interference filter is bonded to a first collimating lens. Then, the first collimating lens with the interference filter attached thereto and a second collimating lens are placed in the V-groove of the bench where they are passively aligned. The two collimating lenses are then bonded to the bench. Fiber array substrates are inserted between the pairs of opposed, spaced, vertical members and a UV transparent block is inserted on top of each fiber array between the corresponding pair of opposed, spaced, vertical members. The fiber arrays are actively aligned. After proper alignment is achieved, adhesive is wicked into the spaces between the fiber array, the block and the vertical members. The adhesive is then cured.

46 Claims, 7 Drawing Sheets

OPTICAL ADD/DROP FILTER AND METHOD OF MAKING SAME

RELATED APPLICATION

This application is based on U.S. Provisional Application No. 60/186,709 filed Mar. 3, 2000 entitled "Four Channel Dual Filter DWDM/DWDM Optical Bench", the disclosure of which is incorporated herein by reference.

FIELD OF THE INVENTION

The invention pertains to optical wavelength division multiplexers/demultiplexers (WDMs)), sometimes termed ADD/DROP filters, and particularly dense wavelength division multiplexers/demultiplexers (DWDMs).

BACKGROUND OF THE INVENTION

The use of optical fibers as a medium for transmission of digital data (including voice) is becoming increasingly more common due to the high reliability and large bandwidth available with optical transmission systems. A well known technique for even further increasing the amount of information which can be carried on a single fiber is wavelength division multiplexing (WDM) or dense wavelength division multiplexing (DWDM). In WDM and DWDM, multiple channels are transmitted on a single fiber simultaneously, each channel being transmitted with a different wavelength of light. The channels can be separated at the receivers with wavelength selective filters. The different channels are combined onto a transmission fiber using components which are commonly termed optical ADD/DROP filters. Typically, each ADD/DROP filter can add (in the case of multiplexing) or drop (in the case of de-multiplexing) one wavelength channel to or from a fiber path.

Figure 12:
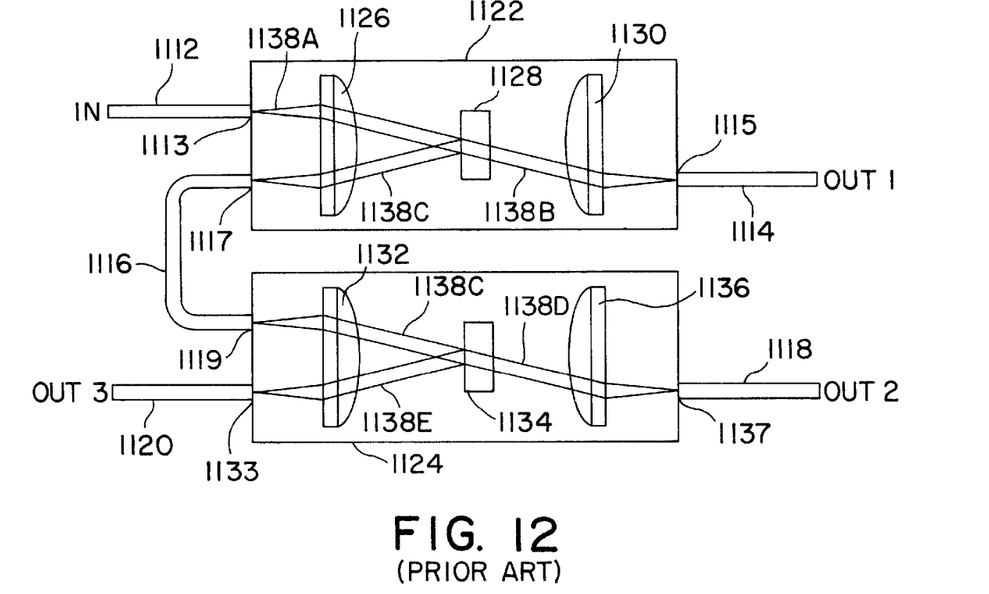
FIG. 12 is a pictorial diagram illustrating the operation of an optical ADD/DROP filter of the prior art.

FIG. 12 is a diagram illustrating a three channel de-multiplexer (or DROP) utilizing two optical ADD/DROP filters 1122 and 1124 to demultiplex an input fiber carrying three (or more) channels to three output fibers, each containing one of the three channels. In particular, an input or common fiber 1112 carries a light beam 1138A comprising three wavelength channels. In the first ADD/DROP filter 1122, the input beam 1138A is input from fiber 1112 through a common port 1113 (so termed because it is the port that corresponds to the beam containing the combined wavelength channels whether the device is being used to multiplex or demultiplex). Common port 1113 is at the front focus of a collimating lens 1126. The collimating lens may take the form of a gradient index (GRIN) lens, as is well known in the art. In particular, when the beam 1138A exits input fiber 1112, the light is not collimated. Lens 1126 collimates the light and directs it onto an interference filter 1128. Interference filters are well known in the art. In particular, interference filters reflect all light except light in a specific narrow wavelength band. The particular wavelength that will be passed by an interference filter is a function of the angle at which the light strikes the filter (thus, the need for collimating lenses 1126 and 1130). Thus, filter 1128 is oriented at an angle relative to input fiber 1112 and lens 1126 such that one of the wavelength channels will be transmitted while the other wavelength channels will be reflected. The light beam 1138B from the transmitted channel passes through collimating lens 1130 into transmit port 1115 (so named because the light passing through this port is transmitted through the interference filter 1128 regardless of whether the device is configured as a multiplexer or demultiplexer) and into the first output fiber 1114. The remaining light 1138C comprising the remaining two channels is reflected from filter 1128 back into collimating lens 1126 which is oriented to transmit light 1138C into reflect port 1117 (so named because the light passing from this port is reflected through the interference filter 1128 regardless of whether the device is configured as a multiplexer or demultiplexer) and into fiber 1116. Accordingly, ADD/DROP filter 1122 has dropped one wavelength channel and placed it in output fiber 1114.

Light beam 1138C is then input from reflect port 1117 into output fiber 1116 to the input/common port 1119 of a second ADD/DROP filter 1124. Second ADD/DROP filter 1124 is essentially identical to first ADD/DROP filter 1122 and comprises two lenses 1132 and 1136, which also may comprise GRIN lenses, and an interference filter 1134. ADD/DROP filter 1124 differs from ADD/DROP filter 1122 in essentially one or two ways. Interference filter 1134 may be a different filter, designed to pass a different wavelength channel. Alternately, interference filter 1134 is identical to interference filter 1128, but common port 1119, lens 1132 and filter 1134 are oriented such that light beam 1138C strikes filter 1134 at a different angle, this angle chosen to drop (i.e., transmit) a different wavelength channel. That beam 1138D passes through lens 1136 into transmit port 1137 to another output fiber 1118. The reflected light beam 1138E now contains one less channel. Light beam 1138E is reflected back through lens 1132 to reflect port 1133 and into another output fiber 1120.

The configuration of an optical ADD/DROP filter as a multiplexer should be apparent from the above description of a de-multiplexer configuration.

The construction of ADD/DROP filters such as ADD/DROP filters 1122 and 1124 is difficult, expensive, and time consuming. For instance, since the transmission characteristics of single mode optical fibers are highly dependent on the lateral positioning of one fiber with respect to another, ADD/DROP filters require extremely precise assembly and alignment of the optical components in the assembly and of the assembly with the fiber arrays. Further, losses occur at each interface, i.e., the interfaces between the fibers and the collimating lenses and between the collimating lenses and the interference filter.

In manufacturing optical ADD/DROP filters, the optical components are commonly bonded to each other. This type of ADD/DROP filter construction creates additional potential problems. Adhesive typically appears between the optical components and, thus, in the optical path. Over time, the optical power degrades the adhesive and frequently leads to increased optical losses or even failure of the optical ADD/DROP filter.

Due to the expense of ADD/DROP filters, it is desirable to increase the number of wavelength channels which can be added or dropped in a given ADD/DROP filter. U.S. Pat. No. 5,799,121 discloses an ADD/DROP filter design which allows two channels to be added or dropped per ADD/DROP filter. In the apparatus disclosed in that patent, one side of the ADD/DROP filter has four ports, namely, two common ports and two reflect ports. The other side has two ports, namely, two transmit ports. In short, this patent discloses an ADD/DROP filter in which two input beams are input from two separate input fibers so as to travel adjacent to each other through the ADD/DROP filter whereby the devices add or drop two channels simultaneously.

Accordingly, it is an object of the present invention to provide an improved optical ADD/DROP filter.

It is another object of the present invention to provide an improved method and apparatus for dense wavelength division multiplexing/de-multiplexing.

It is a further object of the present invention to provide an optical ADD/DROP filter that is inexpensive and has low optical loss characteristics.

It is yet another object of the present invention to provide a method of fabricating an optical ADD/DROP filter that is inexpensive.

It is yet a further object of the present invention to provide an optical ADD/DROP filter that can add or drop two or more channels.

SUMMARY OF THE INVENTION

The invention is an optical ADD/DROP filter suitable for dense wavelength division multiplexing/de-multiplexing. In accordance with the invention, an optical bench comprising a unitary body or two mating halves which are coupled together via alignment pins, preferably in a manner such that the two halves are offset from each other, is provided. In a preferred embodiment, the optical bench is formed of a metal such as stainless steel or titanium that is manufactured by wire electrical discharge machining (wire EDM). Alternately, it may be molded of powdered injected metal (PIM) or ceramic. An interference filter is bonded to one of the two collimating lenses with an annulus of adhesive around the lens/filter interface. No adhesive appears in the optical path.

The entire bench (whether unitary or comprising two mated halves) comprises a longitudinal V-groove 68 running essentially the entire length of the bench into which the collimating lenses and interference filter are dropped such that the collimating lenses and filter are passively aligned. The two collimating lenses are then bonded in the V-groove. The two collimating lenses are positioned so as to leave an air gap between the filter and the second collimating lens. No adhesive is applied there between.

The bench includes first and second pairs of opposed, spaced, vertical members at each end thereof between which a fiber array block is inserted. A glass block is inserted on top of the fiber array substrate between the two vertical members and the common fiber array (i.e, the fiber array containing the fibers that will be coupled to the common and reflect ports) is inserted between the first pair of vertical members and is actively aligned. When proper alignment is achieved, adhesive is wicked into the spaces between the fiber array, the glass block, and the vertical members. If necessary, alignment is then readjusted. The adhesive is then cured. The same process is then repeated for the transmit fiber array.

This design allows for low cost precision alignment of the optical components and further provides an ADD/DROP filter in which no adhesive is in the optical path.

In a preferred embodiment, the optical bench, collimating lenses and interference filter are of a size that allows two adjacent optical paths through the optical components such that each ADD/DROP filter can be used to add or drop two wavelength channels. In this embodiment, the common side of the ADD/DROP filter includes four ports (two common ports and two reflect ports) and the transmit side contains two transmit ports.

BRIEF DESCRIPTION OF THE DRAWINGS

Advantages of the present invention will be apparent from the following detailed description, which description should be considered in conjunction with the accompanying drawings in which.

DETAILED DESCRIPTION OF THE INVENTION

Figure 1:
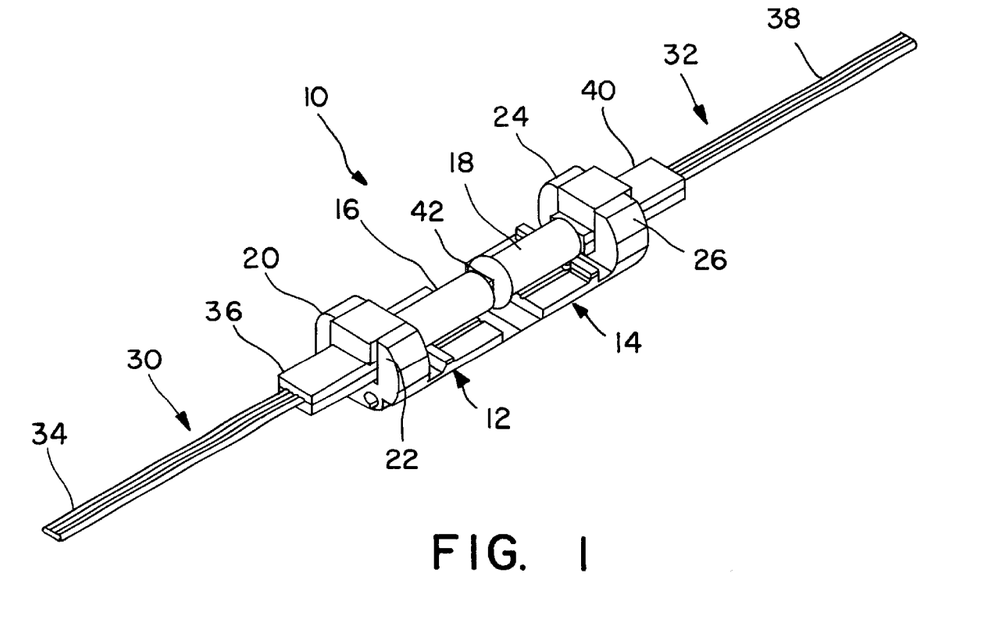
FIG. 1 is a perspective view of an exemplary optical bench assembly in accordance with the present invention.

Turning now to FIG. 1, there is shown an exemplary DWDM optical bench 10 consistent with the present invention. In the illustrated embodiment, the bench includes first 12 and second 14 halves, which are joined together in a manner to be described in greater detail below. Providing the bench in segments, e.g. in first and second halves, facilitates offset alignment of collimating lenses 16, 18, which preferably are GRIN lenses, disposed in the respective halves 12, 14 for optimizing optical coupling in some applications. Offset alignment allows for a more optimal optical path through the ADD/DROP filter since, as discussed above, the input light beam travels through the GRINs and the filter at an angle to their optical axes. Accordingly, to provide the optimal path, the GRINs should be offset from each other rather than perfectly aligned longitudinally. Nevertheless, those of skill in the art will recognize that the bench may be formed as a unitary structure without offset between the optical components if the designers are willing to make a minor sacrifice in terms of optical efficiency. It also is possible to form a unitary bench with offset. However, if the bench is formed of stainless steel and if offset is desired, constructing the bench from two separate halves is likely to be more cost efficient since it may preclude construction by wire EDM as discussed further below.

In a manner to be described in greater detail below, the halves 12, 14 of the optical bench 10 are joined by one or more pins. Each half includes a pair of opposed spaced vertical members 20, 22 and 24, 26, respectively, between which is defined an opening for receiving a fiber array 30, 32. The fiber arrays 30, 32 are constructed in a manner well known in the art. The fiber array 30, 32 may comprise, for example, a plurality of optical fibers 34, 38 located precisely in V-grooves etched in a silicon substrate 36, 40. Those skilled in the art will recognize that the fiber arrays can be configured for a variety of particular functionalities, and may be constructed in a variety of manners known to those skilled in the art.

Figure 2:
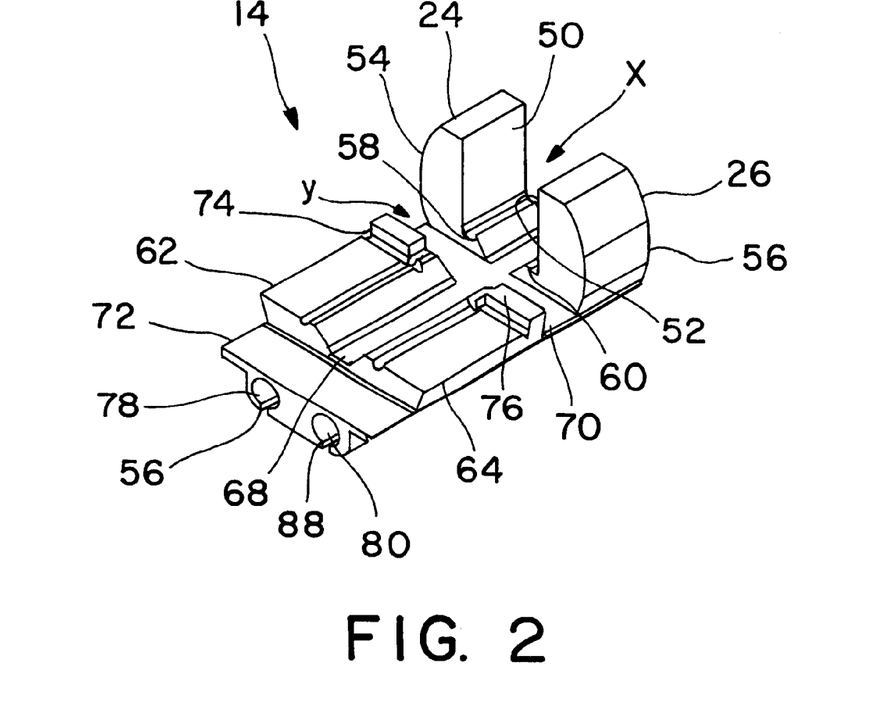
FIG. 2 is a perspective view of an exemplary optical bench assembly half consistent with the present invention.

Advantageously, the optical bench 10 facilitates precise optical alignment, or precise offset alignment, between the fiber arrays 30, 32, the GRIN lenses 16, 18 and, for example, an optical filter 42. Turning now to FIG. 2, there is shown one half 14 of an optical bench 10 in accordance with the invention. The description herein will proceed with respect to the half illustrated in FIG. 2, with the understanding that the opposing half of the bench is substantially identical. Each half of the bench 10 may be constructed from a metal, e.g. stainless steel or titanium, using, for example, wire electrical discharge machining (wire EDM). 400 series stainless steel is one preferred material because it has a lower coefficient of thermal expansion than 300 series stainless steel and more closely matches the coefficient of thermal expansion of GRIN lenses. Wire EDM processes are known to those of skill in the art, and allow for the creation of complex, precise features at relatively low cost. Those skilled in the art will recognize that there are other useful methods of constructing the bench 10. In the preferred embodiment illustrated in the figures, the optical bench can be formed using wire EDM in two orthogonal directions. More complex shapes can be formed, if necessary, using further directions of wire EDM.

As illustrated in FIG. 2, the exemplary half 14 includes the opposed spaced vertical members 24, 26 defining the opening X there between for receiving a fiber array, e.g., fiber array 32 illustrated in FIG. 1. Each of the vertical members 24, 26 includes a substantially planar interior surface 50, 52 and a generally arcuate exterior surface 54, 56 for facilitating assembly of the bench 10 in a tube, as will be described in greater detail below. Other geometries for the interior and exterior surfaces of the vertical members may be provided depending on the geometries of the fiber array substrate received within the opening X and the packaging for the bench.

Shelves 58, 60 disposed between the vertical portions and plateaus 62, 64 include opposed beveled inner surfaces defining a central V-groove 68 in the half 14 for facilitating alignment of the GRIN lens 18 in the half 14. A transverse flat surface 70 is formed in the half 14 between the vertical portions 24, 26 and the plateaus 62, 64 to intersect the V-groove 68. The flat surface 70 provides a transverse opening Y that facilitates observation of the fiber/collimating lens interface during alignment of the fiber array to the collimating lens. Each plateau may include a stop locator tab 74, 76 projecting vertically therefrom adjacent the flat surface 70. The stop locator tabs 74, 76 may be used as a stop to locate rails 110, 112, which may be provided as discussed further below in connection with FIG. 8 to stiffen the optical bench during assembly. At an opposite end of the plateaus 62, 64, a flat transverse relief or shelf 72 is provided to accommodate the adhesive used for joining the filter 42 with the GRIN lens 18 during assembly.

Figure 3:
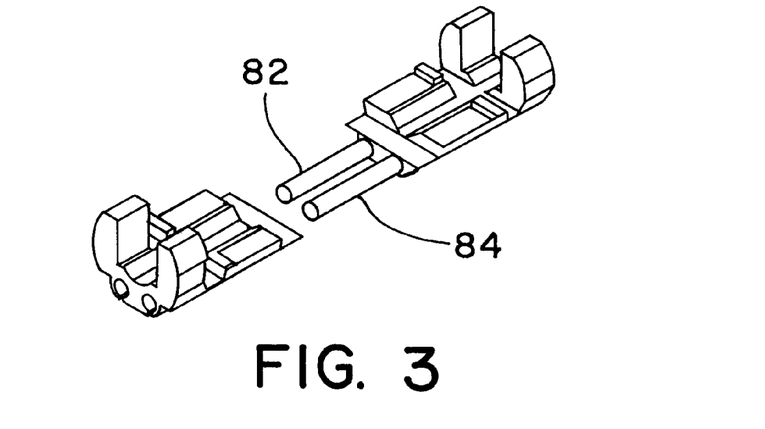
FIG. 3 is a perspective view of first and second halves of an optical bench in accordance with the present invention showing alignment pins inserted into associated alignment pin holes of one of the halves.

With reference now to FIGS. 2 and 3, the half 14 is provided with one or more alignment pin holes 78, 80. In the illustrated embodiment, two such alignment pin holes are provided, each of which receives an associated pin 82, 84.

Those skilled in the art will recognize that any number of holes and pins may be provided to achieve the alignment described herein. In the illustrated embodiment, the holes 78, 80 include slots 56, 88. Those slots 56, 88 are provided so that the holes 78, 80 can be made without the need to break the wire used in the wire EDM process. The slots 56, 88 also provide some resilience to the bench allowing the hole to open slightly when an associated pin 82, 84 is inserted, thereby allowing a tight fit between the holes and the pins. Other mechanisms may be provided for establishing connection and alignment between the two halves. For example, instead of the pin and hole arrangement illustrated herein, mating shapes could be constructed on the respective ends of the halves 12, 14. Other means of joining the halves will be apparent to those skilled in the art.

Figure 4:
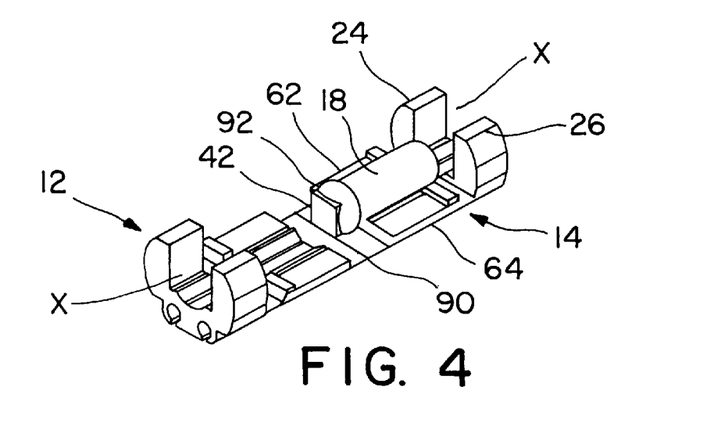
FIG. 4 is a perspective view of first and second joined halves of an optical bench assembly in accordance with the invention showing the positioning of a collimating lens and optical filter relative to a V-groove in one half of the optical bench assembly.

Turning now to FIG. 4, the two halves 12, 14 of the bench 10 are joined together by inserting the pins 82, 84 in corresponding alignment pin holes in their respective halves. An adhesive may be applied to the end surfaces of the halves to provide a stable and secure connection between the halves at a seam 90. The alignment pin holes may be offset in the respective halves so that when the two halves are joined by the pins and adhesive, the V-grooves in the two halves for receiving the associated GRIN lenses are offset by a predetermined amount, e.g. 100 microns, for providing precision offset optical alignment of the lenses. The pins in the alignment holes thus provide precision alignment between the two halves of the bench and also give the assembly mechanical rigidity.

Figure 5:
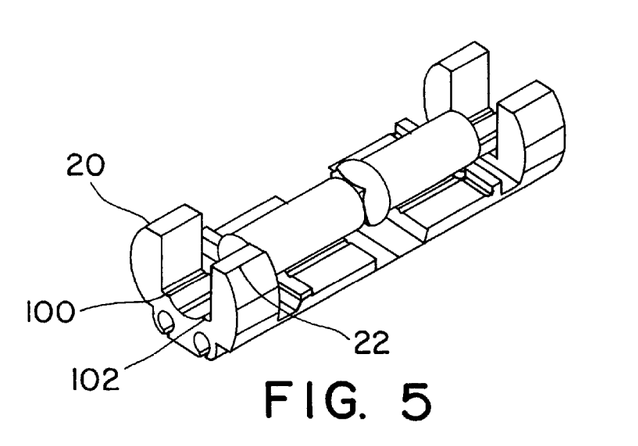
FIG. 5 is a perspective view of the optical bench assembly illustrated in FIG. 4 wherein a second collimating lens is disposed in a V-groove in another half of the assembly.

During assembly, the optical filter 42, e.g. interference filter, is attached to a first one of the GRIN lenses, e.g. lens 18, by applying an annulus of adhesive 92 to surround, seal, and protect the surface of the filter and leaving an air gap between the GRIN lens and the filter surface. No adhesive is placed in the optical path. Both GRIN lenses may be angle polished at, for example 8°, to reduce back reflections. Such GRIN lenses are well known in the art, and are available, for example, from Nippon Sheet Glass Company, Ltd. of Kanagawa, Japan. The GRIN lens 18 with the filter 42 bonded thereto is then placed and bonded in the portion of the V-groove 68 between the plateaus 62, 64. The GRIN lens 18 rests in the V-groove supported on the sides of the V-groove such that, when the GRIN lens is dropped into the V-groove, it automatically comes to rest in the equilibrium position thus automatically precisely aligning the GRIN lens in the plane transverse to the optical path. Since the lenses are not rotationally symmetric, i.e., one end face of each of the GRIN lenses is normally polished at an 8 degree angle, the lenses are then rotated to the proper orientation within the groove. The other GRIN lens 16 is bonded in the V-groove in the opposing half 12 of the bench with an air gap disposed between the lens 16 and the filter 42, as shown in FIG. 5.

Figure 6:
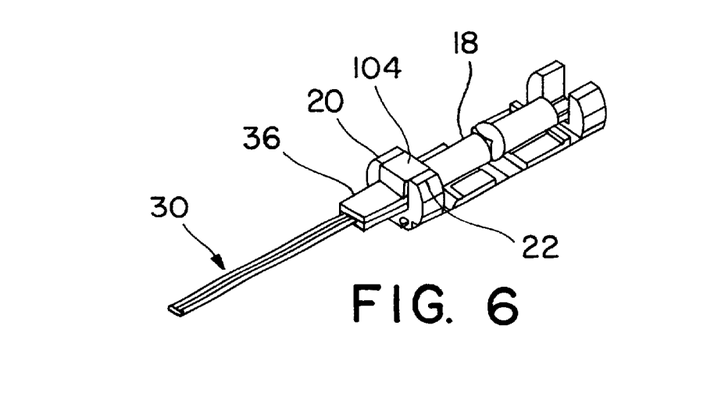
FIG. 6 illustrates the optical bench assembly shown in FIG. 5 wherein a first fiber array has been joined to a first half of the assembly using a UV transparent block.

Referring now to FIG. 6, the two halves of the bench are then clamped to a fixed location with minimal stress to avoid distortion of the assembly. The silicon substrate 36 of the fiber array 30 is then inserted into the opening X between the vertical portions 20, 22. The fit between the silicon substrate 36 and the opening X may be relatively loose, allowing the fiber array to be aligned with the GRIN lens without restriction.

A block 104 of, for example, fused silica or borosilicate glass, is placed on top of the substrate 36. The block 104 has a coefficient of thermal expansion that substantially matches that of the silicon substrate 36 and preferably has the minimum clearance inside of the opening X that allows the block to move freely between the vertical space portions 20, 22 (e.g., about 10 microns on each side). For example, the block 104 may be made by dicing a 1 mm wafer of fused silica, allowing a tight tolerance on the dimensions of the block. Alternately, the block may be formed of borosilicate. Borofloat™ is one preferred borosilicate glass that is available in sheet form. Wire EDM allows manufacture of the opening X to a tight tolerance, and therefore the gap between the block 104 and the opening X may be held to a minimum, for example, 10 microns on each side.

With the block 104 disposed in the opening on top of the silicon substrate 36 of the fiber array 30, the fiber array 30 may be aligned to the GRIN lens 16 using, for example, a Newport Auto-Align station manufactured by Newport Corporation of Irvine, Calif., USA. There is clearance between the end of the silicon substrate 36 and the GRIN lens 16 to allow alignment of the fiber array without interference. Other alignment apparatus and methods also may be used.

During alignment, the block 104 is held in contact with the substrate 36 by gravity. Once the fiber array 30 and the GRIN lens 16 are aligned, a UV curable adhesive may be wicked into the gaps between the block 104 and the vertical portions 20, 22 and between the block and the silicon substrate 36 of the fiber array 30. If necessary, the alignment may be optimized again before curing the adhesive using a UV light, since the addition of the adhesive may disturb the previously set alignment.

To facilitate curing of the adhesive, the block 104 should be made of a material that transmits UV light. An advantage of using UV curable adhesive is the rapid cure time provided thereby. This allows the optical bench 10 to be removed from the alignment station as soon as possible, minimizing the time that the part must spend therein. The fiber array 32 is then aligned and bonded to the half 14 of the bench assembly in a manner identical to that described above with respect to fiber array 30 and half 12.

In a preferred embodiment, the common fiber array (the array comprising the input and reflect fibers) is aligned and bonded first. The common fiber array requires alignment in only the three orthogonal axes, X, Y and Z. No rotational adjustments are necessary. Then the transmit fiber array is aligned and bonded second. Alignment of the transmit fiber requires adjustment in 5 or 6 degrees of freedom, i.e., X, Y, Z, pitch and yaw (and roll, if more than one transmit channel).

In accordance with the invention, the adhesive lines where the fiber arrays are bonded as well as where the optical components are bonded are only about 10 microns thick. When cured, typical epoxies and other adhesives shrink approximately 2%. This may lead to slight movement of the optical components during curing. However, with adhesive lines as thin as 10 microns or less, the maximum movement due to a 2% shrinkage would, therefore, be approximately 0.2 microns. This small amount of movement is acceptable and will not significantly diminish the alignment.

Figure 7A:
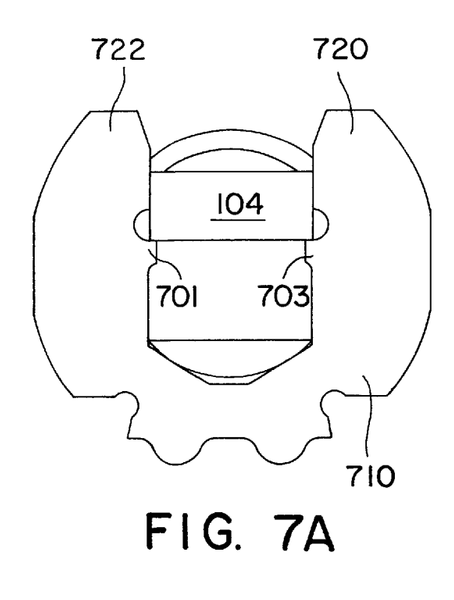
FIGS. 7A, 7B and 7C are end views of an optical bench assembly in accordance with an alternate embodiment of the invention showing the bench at three different stages of fabrication.
Figure 7B:
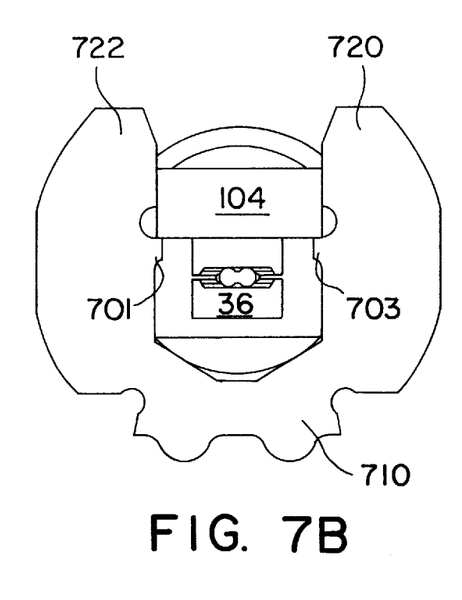
Figure 7C:
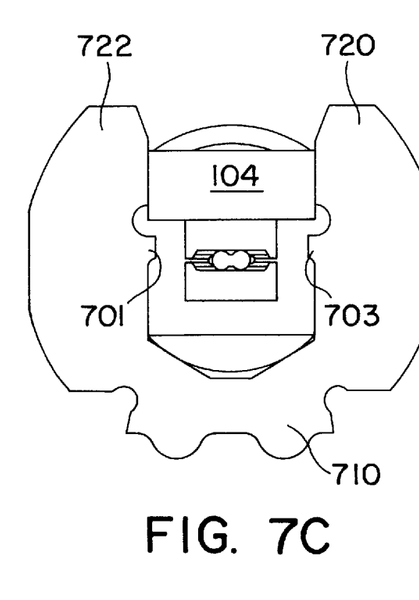

FIGS. 7A–7C are end views of an optical bench assembly in accordance with an alternative embodiment of the invention that provides potentially easier assembly. This embodiment is substantially similar to the embodiment heretofore described except that the vertical members (of which only one pair 720, 722 can be seen in end view) of the bench 710 include shelves 701, 703 that are spaced apart from each other in the lateral direction less than the width of the glass blocks 104, 106. Thus, the glass block 104 or 106 can slide into and through the upper portion of the space X between the vertical members. However, it cannot fall below the horizontal plane defined by the shelves 701, 703, but instead will rest on the shelves. The shelves 701, 703 are positioned such that, when the glass block 104 or 106 rests on the shelf, the fiber array substrate 36 can be inserted between the vertical members 720, 722 beneath the glass block without touching the glass block.

The shelves 701, 703 provide a place to rest the glass blocks 104, 106 prior to bonding. In fact, in certain embodiments, the glass blocks 104, 106 may be rested on the shelves until the alignment operation. Specifically, FIG. 7A shows the bench assembly just prior to insertion of the fiber array substrate and alignment. The glass block 104 is resting on the shelves 701, 703. In FIG. 7B, the fiber array substrate 36 has been inserted between the vertical members 720, 722. In FIG. 7C, the fiber array substrate 36 is raised to lift the glass block 104 off of the shelves 701, 703 and the alignment apparatus can perform the alignment operation. When the alignment operation is completed, the glass block 104 can be adhered to the fiber array substrate 36 and to the vertical members 720, 722 as previously described.

Figures 8, 9:
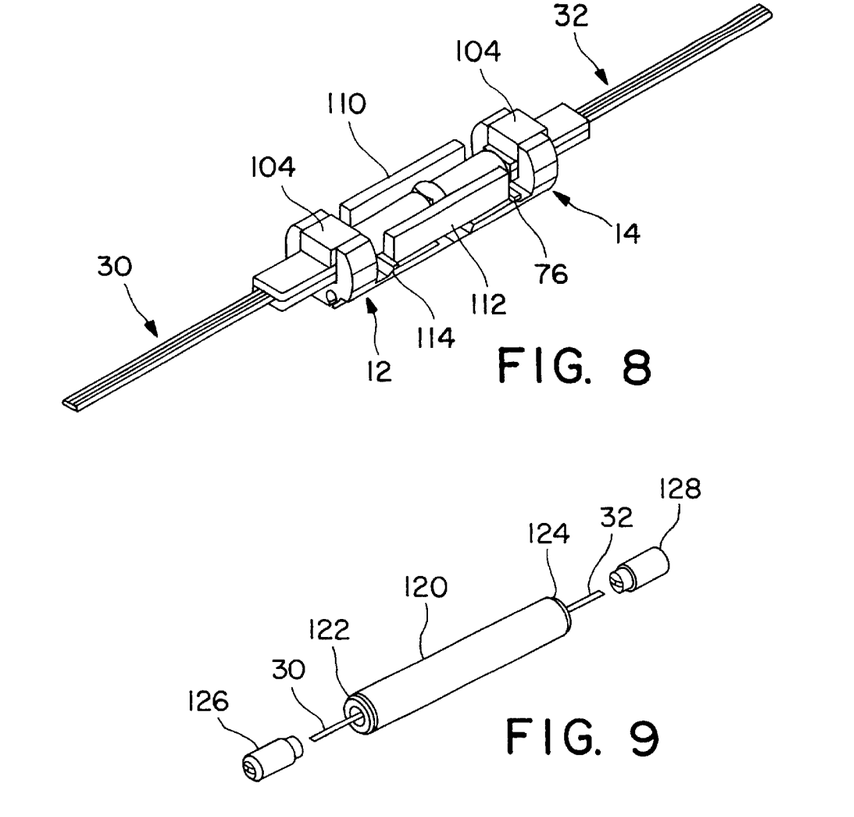
FIG. 8 illustrates the optical bench assembly as shown in FIG. 6 wherein a second fiber array has been joined to a second half of the assembly using a second UV transparent block, and wherein side rails have been provided.
FIG. 9 is an exploded view of a packaging assembly for an optical bench in accordance with the present invention.

Turning to FIG. 8, the rigidity of the optical bench assembly may be improved by adding optional side rails 110, 112. The rails may comprise a variety of materials, e.g. steel, glass or titanium. The rails can be formed of the same material as the bench. As shown, the side rail 112 is positioned between the locator tab 76 (FIG. 2) on half 14 and a corresponding locator tab 114 on the half 12. Similarly, the rail 110 is disposed between locator tab 74 (FIG. 2) and the corresponding tab on the half 12. The rails may be added to the assembly once the fiber arrays have been secured thereto. In some cases, however, it may be useful to install the rails immediately after the halves 12 and 14 are joined to achieve the improved rigidity for the structure during installation of the GRIN lenses filter and fiber arrays. The rails 110 and 112 may be bonded to said tabs and/or to the plateaus 62, 64. The rails serve to stiffen the assemble.

The order of the assembly steps discussed above is merely exemplary and can be altered while still achieving the benefits of the invention. For instance, the common fiber array (containing the input and reflect fibers) may be actively aligned before or after the second GRIN lens is placed in the bench.

Figure 10:
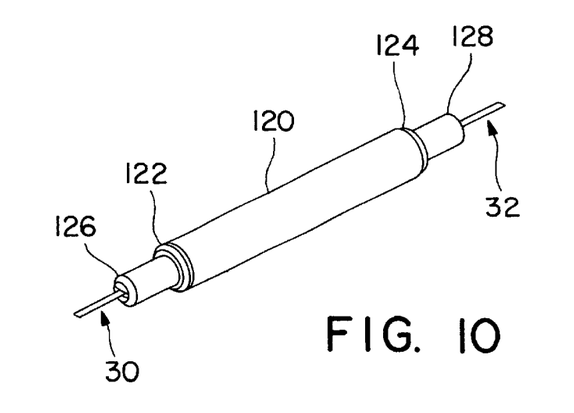
FIG. 10 is a perspective view of a completed packaging assembly for an optical bench in accordance with the present invention.

The external packaging for an optical bench consistent with the invention may take a variety of forms, as will be recognized by those skilled in the art. In one embodiment, the packaging may comprise a cylindrical tube 120 positioned over the optical bench assembly as shown in FIGS. 9 and 10. The tube 120 may be terminated with end caps 122, 124, which are bonded or soldered onto the tube and fiber arrays 30, 32, respectively, thereby providing a seal for resisting moisture penetration into the tube 120. Strain relief boots 126, 128, mate with the end caps 122, 124, respectively, to provide strain relief for the fibers entering the tube 120.

As stated above, an optical bench consistent with the present invention has the attendant advantages of passive alignment of the collimating lenses in the optical bench. The present invention enables a simple design with a minimal number of parts without sacrificing performance. Pins may be used to join separate identical halves of the assembly with a precise offset between the two collimating lenses, if desired. In addition, fiber arrays may be joined to the steel assembly using a UV curable epoxy adhesive through the use of a UV transparent block disposed on top of the fiber array. The block provides a tight fit with the steel vertical members of the bench and between the block in the fiber array, so that only thin layers of adhesive are required to secure the array to the assembly. Furthermore, in this ADD/DROP filter, there is no adhesive in the beam path. Particularly, there is no adhesive at all between GRIN lens 16 and filter 42 or between the fiber arrays and the GRIN lenses. Further, while filter 42 is bonded to GRIN lens 18, the adhesive is not in the optical path, but is in a very thin band surrounding the filter 42. The air gap between GRIN lens 16 and filter 42 should be at least 10 microns to allow for temperature expansion of the optical components without strain.

Figure 11:
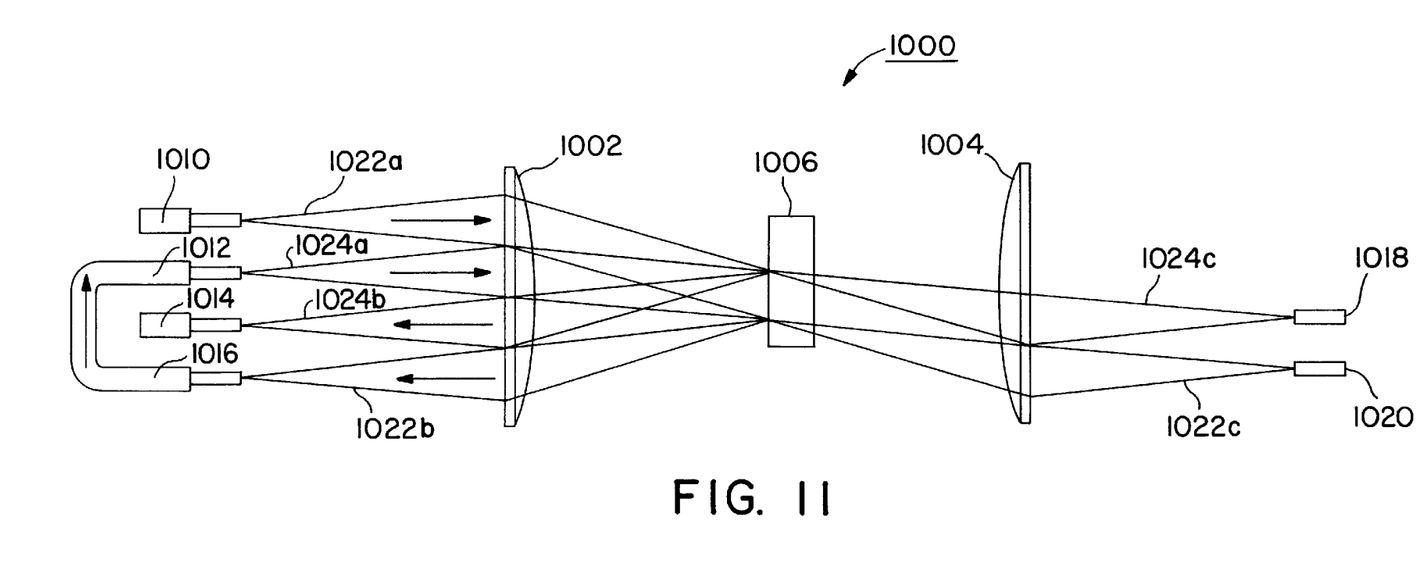
FIG. 11 is a pictorial diagram illustrating the operation of an optical ADD/DROP filter in accordance with one preferred embodiment of the present invention.

FIG. 11 conceptually illustrates an embodiment of the invention which allows each ADD/DROP filter of the design described herein before to be used to add or drop two wavelength channels. In this embodiment, the physical structure of the ADD/DROP filter 1000 is essentially identical to that described hereinbefore, with the possible exception that the optical components, i.e., the GRIN lenses 1002 and 1004 and the filter 1006 are larger in size. This embodiment will be described as a de-multiplexer. However, it will be understood by those of skill in the art that it may also be configured as a multiplexer by changing the fiber assignments.

In this embodiment, there are two input/common ports 1010, 1012, two reflect ports 1014, 1016 and two transmit ports 1018, 1020. The light beam 1022a from common fiber 1010 is split into two beams, namely, beam 1022b which is reflected off of the filter 1006 and comprises all but one of the wavelength channels, and beam 1022c which is transmitted through filter 1006 and contains one wavelength channel. The input, reflect and transmit ports are oriented relative to the GRINs and filter such that transmit beam 1022c enters transmit port 1020 and reflected beam 1022b enters reflect port 1016. Likewise, input beam 1024a from input port 1012 is split in the same manner by filter 1006 into transmit beam 1024c which is directed into the second transmit port 1018, and reflected beam 1024b is directed into the second reflect port 1014. The angle at which the input beams 1022a and 1024a strike filter 1006 differ from each other such that a different channel will be dropped from each beam.

Thus, if the input beam into common port 1010 is a multiplexed beam containing multiple channels and the beam 1022b output from reflect port 1016 is input back into the second input/common port 1012 is as shown in FIG. 11 this ADD/DROP filter configuration will drop two channels from the original input beam 1022a, namely one at transmit port 1018 and another at transmit port 1020. Accordingly, the number of ADD/DROP filters for multiplexing or de-multiplexing multiple wavelength channels can essentially be cut in half using the configuration shown in FIG. 11, thus substantially reducing the cost of DWDMs.

In the dual DWDM embodiment such as illustrated in FIG. 11, alignment of the transmit port requires a 6 degree of freedom alignment, whereas, in the non-dual DWDM embodiment in which there is only one transmit fiber, it is not necessary to adjust the roll degree of freedom.

In the present invention, only two active alignments need be done as described above. In prior art apparatus and methods, each half of the ADD/DROP filter is actively aligned and then coupled together whereupon a third alignment is performed. Further, in the prior art, it is frequently necessary after all of the components are bonded together to then have to bend the entire unit back into alignment. Accordingly, four alignments, rather than two were done.

It should be understood by those skilled in the art that, while the detailed discussion above was specific to a de-multiplexer, the exact same apparatus can be used as a multiplexer also. Particularly, to use the disclosed ADD/DROP filter as a multiplexer, one would merely input the input/common beam (containing one or more wavelength channels) into the reflect port or ports, and input into the transmit port another beam containing a wavelength channel to be added. The common port would then be the output port containing the combined beams input from the reflect port and the transmit port. It is self-evident that the angles of incidence of the input beams on the interference filter and the wavelengths contained in the input beams must be selected such that the light beam input into the reflect port is reflected off of the interference filter and the wavelength channel contained in the input beam into the transmit port is transmitted by the interference filter.

Further, the principles of the present invention may be applied to other types of optical components such as coarse WDM filters, colored glass filters or electronically variable optical attenuators by substituting for the interference filter a coarse WDM filter, a colored glass filter, or a electrochromic material, respectively.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. An optical bench for supporting optical components in an optical device, said optical bench comprising:

a body having a V-groove oriented in a longitudinal direction of said bench, said V-groove adapted to accept a lens and passively align said lens in a plane transverse said longitudinal direction;

first and second pairs of opposed spaced vertical members positioned at opposite longitudinal ends of said bench, each of said pairs of vertical members spaced from each other so as to accept a fiber array substrate; and first and second blocks dimensioned to fit between said first and second pairs of vertical members on top of a fiber array substrate inserted between said vertical members, respectively, with a clearance that allows said blocks to slide freely there between.

2. The optical bench of claim 1 wherein said bench is formed of a metal.

3. The optical bench of claim 2 wherein said metal is titanium.

4. The optical bench of claim 2 wherein said metal is steel.

5. The optical bench of claim 2 wherein said bench is formed using wire electrical discharge machining.

6. The optical bench of claim 2 wherein said bench is formed using wire electrical discharge machining in two directions.

7. The optical bench of claim 1 wherein said bench is unitary.

8. The optical bench of claim 1 wherein said bench comprises two mating halves, each of said halves further comprising at least first and second alignment holes in said longitudinal direction for accepting alignment pins for joining said first and second halves.

9. The optical bench of claim 8 wherein said alignment holes of said first half and said alignment holes of said second half are positioned such that said V-groove is offset in the longitudinal direction.

10. The optical bench of claim 8 wherein said first and second halves are bonded to each other.

11. The optical bench of claim 1 further comprising first and second plateaus within which said V-groove is positioned and a first shelf intermediate said bench and transverse said V-groove, said shelf having a surface lower than said plateaus, said shelf allowing free air space for accepting adhesive used for fixing optical components in said bench.

12. The optical bench of claim 11 further comprising first and second flat surfaces immediately adjacent said first and second pairs of opposed vertical members and transverse said V-groove, respectively, having a surface lower than said plateaus, said first and second flat surfaces facilitating observation during alignment of optical components mounted in said bench.

13. The optical bench of claim 1 further comprising:
   first and second pairs of tabs said first pair of tabs defining a first line parallel to and on one side of said V-groove and said second pair of tabs defining a second line parallel to and on an opposite side of said V-groove, said first and second tabs defining a longitudinal distance there between; and
   first and second rails positioned longitudinally between said first and second pairs of tabs, respectively, said rails being approximately equal to said distance between said first and second pairs of tabs.

14. The optical bench of claim 13 wherein said rails are bonded to said tabs.

15. The optical bench of claim 1 wherein said blocks are transparent to UV light.

16. The optical bench of claim 15 wherein said blocks are formed of glass.

17. The optical bench of claim 16 wherein said blocks are formed of borosilicate glass.

18. An optical ADD/DROP filter comprising:
   an optical bench having a V-groove oriented in a longitudinal direction of said bench, said V-groove adapted to accept at least one lens and passively align said lens in a plane transverse said longitudinal direction;
   first and second pairs of opposed spaced vertical members positioned at opposite longitudinal ends of said bench, each of said pairs of vertical members spaced from each other so as to accept a fiber array;
   first and second collimating lenses positioned at an equilibrium position in said V-groove;
   an interference filter positioned in an optical path between said first and second collimating lenses;
   a first fiber array substrate positioned between said first pair of opposed vertical members;
   a second fiber array substrate positioned between said second pair of opposed vertical members; and
   first and second blocks dimensioned to fit between said first and second pairs of vertical members on top of said first and second fiber array substrates, respectively;
   wherein said interference filter is bonded to said first collimating lens, said first and second collimating lenses are bonded in said V-groove of said bench, an air gap is maintained between said interference filter and said second collimating lens, and said first block is bonded between said first pair of opposed vertical members and further bonded to said first fiber array substrate, and said second block is bonded between said second pair of opposed vertical members and further to said second fiber array substrate.

19. The optical ADD/DROP filter of claim 18 wherein said first and second fiber array substrates are actively aligned with said first and second collimating lenses and said filter prior to being bonded.

20. The optical ADD/DROP filter of claim 18 further comprising:
   a cylindrical tube positioned over said optical bench;
   first and second end caps bonded onto said tube and said first and second fiber arrays, respectively; and
   first and second strain relief boots positioned over said first and second end caps, respectively.

21. The optical ADD/DROP filter of claim 18 wherein said first and second blocks are dimensioned to fit between said first and second pairs of opposed vertical members with a minimum clearance that allows said blocks to slide freely there between.

22. The optical ADD/DROP filter of claim 21 wherein said clearance is about 10 microns on each side.

23. The optical ADD/DROP filter of claim 18 wherein said interference filter is bonded to said first collimating lens by an annulus of adhesive.

24. The optical ADD/DROP filter of claim 18 wherein said bench is formed by wire electron discharge machining.

25. The optical ADD/DROP filter of claim 24 wherein said bench is formed using wire electron discharge machining in two directions.

26. The optical ADD/DROP filter of claim 18 wherein said bench comprises two mating halves, each of said halves further comprising at least first and second alignment holes in said longitudinal direction for accepting alignment pins for joining said first and second halves.

27. The optical ADD/DROP filter of claim 26 wherein said alignment holes of said first half and said alignment holes of said second half are positioned such that said V-grooves of said first and second halves are offset from each other in the lateral direction.

28. The optical ADD/DROP filter of claim 18 further comprising first and second plateaus within which said V-groove is positioned and a first shelf intermediate said bench and transverse said V-groove, said shelf having a surface lower than said plateaus, said shelf allowing free air space for accepting adhesive.

29. The optical ADD/DROP filter of claim 28 further comprising first and second flat surfaces immediately adjacent said first and second pairs of opposed vertical members, respectively, and transverse said V-groove, having a surface lower that said plateaus within which said V-groove is positioned, said first and second flat surfaces for facilitating observation during alignment of optical components mounted in said bench.

30. The optical ADD/DROP filter of claim 18 further comprising:
   first and second pairs of tabs, said first pair of tabs defining a first line parallel to and on one side of said V-groove and said second pair of tabs defining a second line parallel to and on an opposite side of said V-groove, said first and second tabs defining a longitudinal distance there between; and
   first and second rails positioned longitudinally between said first and second pairs of tabs, respectively, said rails being approximately equal to said distance between said first and second pairs of tabs.

31. The optical ADD/DROP filter of claim 30 wherein said rails are bonded to said tabs.

32. The optical ADD/DROP filter of claim 18 wherein said first fiber array comprises two common fibers and two reflect fibers and said second fiber array comprises two transmit fibers and wherein said collimating lenses and interference filter are dimensioned such that said ADD/DROP filter can accommodate dual ADD/DROP functions.

33. The optical ADD/DROP filter of claim 18 wherein said blocks are transparent to UV light.

34. The optical ADD/DROP filter of claim 33 wherein said blocks are formed of glass.

35. The optical ADD/DROP filter of claim 34 wherein said blocks are borosilicate glass.

36. A method of assembling an optical component, said method comprising the steps of:
   (1) providing an optical bench having a V-groove oriented in a longitudinal direction of said bench, said V-groove adapted to accept first and second collimating lenses and passively align said lenses in a plane transverse said longitudinal direction, and first and second pairs of opposed spaced vertical members positioned at opposite longitudinal ends of said bench, each of said pairs of vertical members spaced from each other so as to accept a fiber array substrate;
   (2) fixing a filter to said first collimating lens;
   (3) passively aligning said first collimating lens in said V-groove;
   (4) fixing said first collimating lens in said V-groove; and
   (5) passively aligning said second collaminating lens in said V-groove;
   (6) fixing said second collimating lens in said V-groove.

37. The method of claim 36 further comprising the steps of:
   (7) inserting a common fiber array between said first pair of opposed vertical members;
   (8) placing between said first pair of vertical members a first block dimensioned to fit tightly there between;
   (9) actively aligning said common fiber array;
   (10) fixing said common fiber array to said bench by bonding said first block to said first pair of opposed vertical members and to said common fiber array;
   (11) inserting a transmit fiber array between said second pair of opposed vertical members;
   (12) placing between said second pair of vertical members a second block dimensioned to fit tightly there between;
   (13) actively aligning said transmit fiber array; and
   (14) fixing said transmit fiber array to said bench by bonding said second block to said second pair of opposed vertical members and to said transmit fiber array.

38. The method of claim 36 wherein step (1) comprises:
   (1.1) providing first and second portions of said optical bench, each of said portions having at least two alignment holes for mating with the alignment holes of the other portion;
   (1.2) mating said first and second portions using alignment pints inserted into said alignment holes.

39. The method of claim 38 wherein step (1) further comprises the steps of:
   (1.3) applying adhesive between mating faces of said first and second halves.

40. The method of claim 36 wherein step (2) comprises wicking an annulus of adhesive around an interface between said first collimating lens and said filter.

41. The method of claim 36 wherein step (4) comprises positioning said second collimating lens in said V-groove in a position that provides an air gap between said interference filter and said second collimating lens.

42. The method of claim 36 wherein said block is formed of a material that is substantially transparent to UV light.

43. The method of claim 42 wherein said block is formed of borosilicate glass.

44. The method of claim 37 wherein steps (10) and (14) comprise wicking adhesive between said glass blocks and said opposed vertical members.

45. The method of claim 36 further comprising the steps of:
   (15) placing said bench in a cylindrical tube;
   (16) placing end caps on said tube; and
   (17) placing strain relief boots on said end caps.

46. The method of claim 45 wherein step (16) comprises fixing said end caps on said tube with adhesive.

* * * * *